(12) United States Patent
Toba et al.

(10) Patent No.: US 10,255,875 B2
(45) Date of Patent: Apr. 9, 2019

(54) TRANSMISSION DEVICE, TRANSMISSION METHOD, RECEPTION DEVICE, RECEPTION METHOD, AND TRANSMISSION/RECEPTION SYSTEM

(75) Inventors: Kazuaki Toba, Kaganawa (JP); Gen Ichimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 774 days.

(21) Appl. No.: 14/240,758

(22) PCT Filed: Sep. 6, 2012

(86) PCT No.: PCT/JP2012/072824
§ 371 (c)(1),
(2), (4) Date: Feb. 25, 2014

(87) PCT Pub. No.: WO2013/038991
PCT Pub. Date: Mar. 21, 2013

(65) Prior Publication Data
US 2014/0205024 A1 Jul. 24, 2014

(30) Foreign Application Priority Data
Sep. 12, 2011 (JP) ................................. 2011-197879

(51) Int. Cl.
*H04N 19/85* (2014.01)
*G09G 5/00* (2006.01)
(Continued)

(52) U.S. Cl.
CPC ....... *G09G 5/006* (2013.01); *H04N 21/43635* (2013.01); *H04N 21/816* (2013.01);
(Continued)

(58) Field of Classification Search
CPC ............. H04N 19/85; H04N 21/43635; H04N 21/23892; G09G 5/003; G09G 5/006
(Continued)

(56) References Cited

U.S. PATENT DOCUMENTS 6,898,196 B2 * 5/2005 Voyer .................. H04B 7/2634
370/331
7,868,879 B2 * 1/2011 Rizko .............. H04N 21/23892
345/204
(Continued)

FOREIGN PATENT DOCUMENTS

JP    09-037241 A    2/1997
JP    2001-228841 A    8/2001
(Continued)

OTHER PUBLICATIONS

Google Patent Search log (Year: 2018).*
(Continued)

*Primary Examiner* — Luis Perez-Fuentes
(74) *Attorney, Agent, or Firm* — Chip Law Group

(57) ABSTRACT

Transmission of a high-definition video signal or the like that requires a wide transmission band is realized. A video signal is divided by frames to generate divisional video signals, and the respective divisional video signals are transmitted to an external device via transmission channels independent of one another Transmission of a high-definition video signal or the like that requires a wider transmission band than the transmission band of one transmission channel can be realized in a preferred manner. For each frame, first information indicating the existence of the other divisional video signal to be combined therewith and second information for establishing synchronization with the other divisional video signal to be combined therewith are added to the divisional video signals to be transmitted by a data transmitting unit. In the external device, a reception video signal can be easily obtained by arranging the divisional video signals in the frame order.

21 Claims, 8 Drawing Sheets

(51) Int. Cl.
*H04N 21/4363* (2011.01)
*H04N 21/81* (2011.01)
*H04N 21/2389* (2011.01)

(52) U.S. Cl.
CPC ......... *G09G 5/003* (2013.01); *G09G 2340/12* (2013.01); *G09G 2350/00* (2013.01); *G09G 2370/04* (2013.01); *G09G 2370/12* (2013.01); *H04N 21/23892* (2013.01)

(58) Field of Classification Search
USPC .................................................... 375/240.28
See application file for complete search history.

(56) References Cited

U.S. PATENT DOCUMENTS

| | | | | |
|---|---|---|---|---|
| 8,230,118 | B2* | 7/2012 | Toba | G09G 5/006 710/2 |
| 8,253,859 | B2* | 8/2012 | Suzuki | G09G 5/003 341/50 |
| 8,331,763 | B2* | 12/2012 | Seo | H04N 5/76 386/239 |
| 8,605,797 | B2* | 12/2013 | Shao | H04N 19/89 375/240.24 |
| 8,817,182 | B2* | 8/2014 | Suzuki | G09G 5/003 348/478 |
| 2001/0030649 | A1 | 10/2001 | Mamiya et al. | |
| 2005/0117654 | A1* | 6/2005 | Im | H04N 5/4401 375/240.26 |
| 2005/0123045 | A1* | 6/2005 | Hannuksela | H04N 19/172 375/240.12 |
| 2006/0222203 | A1* | 10/2006 | Mercier | H04N 21/23892 382/100 |
| 2006/0271990 | A1* | 11/2006 | Rodriguez | H04N 21/234309 725/118 |
| 2007/0263937 | A1* | 11/2007 | Rizko | H04N 21/23892 382/232 |
| 2010/0149412 | A1* | 6/2010 | Yamashita | H04N 7/015 348/443 |
| 2011/0176616 | A1* | 7/2011 | Luthra | H04N 13/0048 375/240.16 |
| 2011/0206130 | A1* | 8/2011 | Koto | H04N 19/61 375/240.21 |
| 2012/0154530 | A1* | 6/2012 | Yamada | H04N 13/007 348/43 |
| 2014/0205024 | A1* | 7/2014 | Toba | H04N 21/43635 375/240.28 |
| 2014/0240604 | A1* | 8/2014 | Toba | H04N 21/43635 348/723 |

FOREIGN PATENT DOCUMENTS

| | | |
|---|---|---|
| JP | 2002-135772 A | 5/2002 |
| JP | 2004-088272 A | 3/2004 |
| JP | 2007-306539 A | 11/2007 |
| WO | WO 2009/066582 A1 | 5/2009 |
| WO | WO 2011/027440 A1 | 3/2011 |

OTHER PUBLICATIONS

IEEE search log (Year: 2018).*
International Search Report dated Dec. 18, 2012 in PCT/JP2012/072824.
Office Action for CN Patent Application No. 201280043047.5, dated Sep. 14, 2016, 9 pages of Office Action and 13 pages of English translation.

* cited by examiner

FIG. 2

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier (least significant byte first) ||||||||
| PB2 | ||||||||
| PB3 | ||||||||
| PB4 | Category code ||||||||
| PB5 | DualLink | Rsvd (0) | Rsvd (0) | Rsvd (0) | Rsvd (0) | Rsvd (0) | Rsvd (0) | Rsvd (0) |
| PB6 | Time Code 0 (Units of frames) ||||||||
| PB7 | Time Code 0 (Units of seconds) ||||||||
| PB8 | Time Code 0 (Units of minutes) ||||||||
| PB9 | Time Code 0 (Units of hours) ||||||||
| PB10 | Even/Odd | Rsvd (0) | Rsvd (0) | Rsvd (0) | Rsvd (0) | Rsvd (0) | Rsvd (0) | Rsvd (0) |
| ...PB(Nv) | Reserved(0) ||||||||

FIG. 5

HDMI PIN ARRANGEMENT (CASE OF Type-A)

| PIN | Signal Assignment |
|---|---|
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | Utility/HEAC+ |
| 15 | SCL |
| 16 | SDA |
| 17 | DDC/CEC Ground /HEAC Shield |
| 18 | +5V Power |
| 19 | Hot Plug Detect/HEAC− |

TRANSMISSION DEVICE, TRANSMISSION METHOD, RECEPTION DEVICE, RECEPTION METHOD, AND TRANSMISSION/RECEPTION SYSTEM

TECHNICAL FIELD

The present technique relates to a transmission device, a transmission method, a reception device, a reception method, and a transmission/reception system, and more particularly, to a transmission device and the like that enable transmission of high-definition video signals and the like that require a wide transmission band.

BACKGROUND ART

In recent years, HDMIs (High Definition Multimedia Interfaces) have been widely used as digital interfaces connecting CE (Consumer Electronics) devices, and have become a de facto standard in the industry. Non-Patent Document 1 discloses the HDMI Specification, for example. According to the HDMI Specification, video, audio, and control signals are transmitted as digital signals by using three data differential line pairs (TMDS Channels 0/1/2).

CITATION LIST

Non-Patent Document

Non-Patent Document 1: High-Definition Multimedia Interface Specification Version 1.4, Jun. 5, 2009

SUMMARY OF THE INVENTION

Problems to be Solved by the Invention

At present, the highest transmission speed specified for those digital signals in the HDMI Specification is approximately 10.2 Gbps. Therefore, high-definition video signals such as 4K2K (QFHD)/60 Hz progressive signals or high-quality 3D (three-dimensional) video signals cannot be transmitted.

The present technique aims to realize transmission of high-definition video signals and the like that require a wide transmission band.

Solutions to Problems

A concept of the present technique lies in a transmission device that includes:

a frame dividing unit that obtains divisional video signals generated by dividing a transmission video signal on the frame basis; and a data transmitting unit that transmits the divisional video signals obtained by the frame dividing unit to an external device via transmission channels independent of one another, the data transmitting unit adding first information and second information for each frame to the divisional video signals and transmitting the divisional video signals, the first information indicating existence of the other divisional video signal to be combined therewith, the second information being for establishing synchronization with the other divisional video signal to be combined therewith.

According to the present technique, the frame dividing unit obtains divisional video signals generated by dividing a transmission video signal on the frame basis. The data transmitting unit then transmits the divisional video signals to the external device via the transmission channels independent of one another. For example, the frame dividing unit divides the transmission video signal into two signals, to obtain two divisional video signals. The data transmitting unit then transmits those two divisional video signals to the external device via transmission channels independent of each other. For example, the format of the transmission video signal is 4K×2K/60 Hz progressive, and the transmission video signal is turned into 4K×2K/30 Hz progressive video signals when divided into two signals.

The first information and the second information for each frame are added to the divisional video signals to be transmitted by the data transmitting unit. The first information is information indicating the existence of another divisional video signal to be combined therewith. The second information is information for establishing synchronization with another divisional video signal to be combined therewith. In the external device, the first information and the second information are used to obtain a reception video signal by arranging the divisional video signals in the frame order. For example, the second information is formed with time code information and sequence information indicating the sequential order of frames containing the time code indicated by the time code information.

As described above, according to the present technique, a video signal is divided by frames, to generate divisional video signals. The divisional video signals are transmitted to the external device via the transmission channels independent of one another. Accordingly, transmission of a high-definition video signal or the like that requires a wider transmission band than the transmission band of one transmission channel can be realized in a preferred manner. Also, according to the present technique, first information indicating the existence of the other divisional video signal to be combined therewith and second information for establishing synchronization with the other divisional video signal to be combined therewith are added, for each frame, to the divisional video signals to be transmitted by the data transmitting unit. Accordingly, in the external device, a reception video signal can be easily obtained by arranging the divisional video signals in the frame order.

According to the present technique, the data transmitting unit transmits the divisional video signals to the external device via the transmission channels, using differential signals through a predetermined number of channels. In that case, the first information and the second information for each frame are inserted into blanking periods of the divisional video signals, for example, and are then transmitted. In that case, the data transmitting unit has a digital interface compliant with the HDMI Specification, for example.

According to the present technique, the transmission device may further include a function determining unit that determines whether the external device is compatible with transmission of the divisional video signals generated by dividing the transmission video signal by frames through the transmission channels independent of one another. For example, the function determining unit determines whether the external device is compatible with the transmission based on capability information about the external device, the capability information being read from the external device through the transmission channels. Also, the function determining unit determines whether the external device is compatible with the transmission by communicating with the external device via the transmission channels, for example. With this function determining unit, transmission of the divisional video signals generated by dividing the transmission video signal through the transmission channels independent of one another can be prevented when the external device is not compatible with such transmission.

Another concept of the present technique lies in a reception device that includes a data receiving unit that receives divisional video signals from an external device via transmission channels independent of one another, the divisional video signals being generated by dividing a video signal by frames, the divisional video signals being accompanied by first information and second information for each frame, the first information indicating the existence of the other divisional video signal to be combined therewith, the second information being for establishing synchronization with the other divisional video signal to be combined therewith, the reception device further including a frame arranging unit that obtains a reception video signal by arranging the divisional video signals received by the data receiving unit in frame order based on the first information and the second information.

According to the present technique, the data receiving unit receives divisional video signals generated by dividing a video signal by frames from the external device via the transmission channels independent of one another. The divisional video signals are accompanied by the first information and the second information for each frame. The first information is information indicating the existence of another divisional video signal to be combined therewith. The second information is information for establishing synchronization with another divisional video signal to be combined therewith. The second information is formed with time code information and sequence information indicating the sequential order of the frames containing the time code indicated by the time code information, for example.

As described above, according to the present technique, divisional video signals generated by dividing a video signal by frames are received from the external device via the transmission channels independent of one another. The divisional video signals are then arranged in frame order to obtain a reception video signal based on the first information and the second information accompanying each frame of each of the divisional video signals. The first information indicates the existence of another divisional video signal to be combined therewith, and the second information is for establishing synchronization with another divisional video signal to be combined therewith. Accordingly, a high-definition video signal or the like that requires a wider transmission band than the transmission band of one transmission channel can be received from an external device in a preferred manner.

According to the present technique, the data receiving unit receives the divisional video signals from the external device via the transmission channels, using differential signals through a predetermined number of channels. In that case, the first information and the second information for each frame have been inserted into blanking periods of the divisional video signals, for example, and been transmitted. In that case, the data receiving unit has a digital interface compliant with the HDMI Specification, for example.

Also, according to the present technique, the reception device may further include: ports to which the transmission channels for transmitting the divisional video signals are connected; and a display control unit that performs connection correction display when the transmission channels for transmitting the divisional video signals are not connected to the respective ports. In this case, if the transmission channels are connected on a wrong manner, the user can correct the connection based on the connection correction display.

Also, according to the present technique, the data receiving unit may include a first data receiving unit and a second data receiving unit, and the reception device may further include: a first port to which the first data receiving unit is connected; and second ports to which the second data receiving unit is selectively connected via a switcher. In this case, the second data receiving unit is shared among the second ports for reception, and the circuit size can be reduced accordingly.

Effects of the Invention

According to the present technique, transmission of a high-definition video signal or the like that requires a wide transmission band can be easily realized.

BRIEF DESCRIPTION OF DRAWINGS

FIG. 2 shows an example structure of an HDMI vendor specific infoframe packet (VSIF packet).

FIG. 5 is a diagram showing HDMI (Type A) pin assignment.

MODES FOR CARRYING OUT THE INVENTION

The following is a mode for carrying out the invention (hereinafter referred to as the "embodiment"). Explanation will be made in the following order.

1. Embodiment
2. Modifications

1. Embodiment

Example Configuration of an AV System

Figure 1:
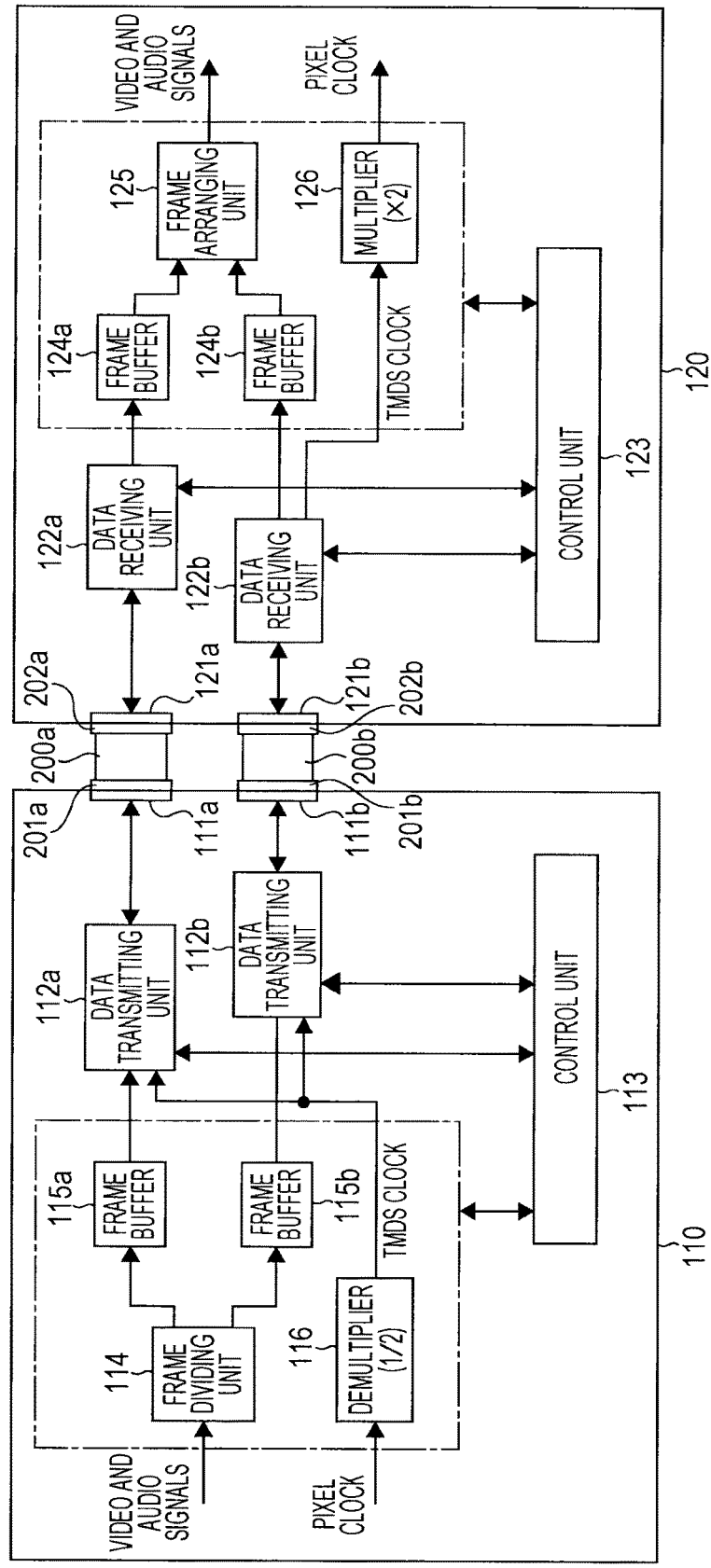
FIG. 1 is a block diagram showing an example configuration of an AV system as an embodiment of the invention.

FIG. 1 shows an example configuration of an AV (Audio and Visual) system 100 as an embodiment. This AV system 100 is formed with a source device 110 and a sink device 120 that are connected to each other. The source device 110 is an AV source such as a game machine, a disk player, a set-top box, a digital camera, or a mobile phone. The sink device 120 is a television receiver or a projector, for example.

The source device 110 and the sink device 120 are connected to each other via HDMI cables 200a and 200b. The source device 110 includes receptacles 111a and 111b forming connectors that have data transmitting units 112a and 112b connected thereto. The sink device 120 includes receptacles 121a and 121b forming connectors that have data receiving units 122a and 122b connected thereto.

A plug 201a forming a connector is provided at one end of the HDMI cable 200a, and a plug 202a forming a connector is provided at the other end. The plug 201a at the one end of the HDMI cable 200a is connected to the receptacle 111a of the source device 110, and the plug 202a at the other end of the HDMI cable 200a is connected to the receptacle 121a of the sink device 120.

A plug 201b forming a connector is provided at one end of the HDMI cable 200b, and a plug 202b forming a connector is provided at the other end. The plug 201b at the one end of the HDMI cable 200b is connected to the receptacle 111b of the source device 110, and the plug 202b at the other end of the HDMI cable 200b is connected to the receptacle 121b of the sink device 120.

The source device 110 includes not only the above mentioned data transmitting units 112a and 112b, but also a control unit 113, a frame dividing unit 114, frame buffers 115a and 115b, and a demultiplier 116. The control unit 113 controls operations of the respective components of the source device 110. The frame dividing unit 114 divides a video signal (image data) and an audio signal (audio data) by frames or on the frame basis. As a result, the frame dividing unit 114 obtains a first video signal formed with odd-numbered frames and a first audio signal corresponding to the first video signal, and a second video signal formed with even-numbered frames and a second audio signal corresponding to the second video signal.

Here, the video signal to be transmitted is a high-definition video signal that requires a wider transmission band than the transmission band of one HDMI cable. In this embodiment, the video signal format is 4K×2K/60 Hz progressive. The first video signal and the second video signal obtained as a result of the frame dividing of the video signal are video signals of 4K×2K/30 Hz progressive. Each of the first video signal and the second video signal can be transmitted in the transmission band of one HDMI cable.

The frame buffer 115a temporarily stores the first video signal and the first audio signal obtained by the frame dividing unit 114. The frame buffer 115b temporarily stores the second video signal and the second audio signal obtained by the frame dividing unit 114. The demultiplier 116 generates a TMDS clock by demultiplying the pixel clock corresponding to the undivided video signal by ½, and supplies the TMDS clock to the data transmitting units 112a and 112b.

The data transmitting units 112a and 112b each have a digital interface compliant with the HDMI Specification, and transmit video signals and audio signals to the sink device 120 via the HDMI cables 200a and 200b.

The data transmitting unit 112a transmits the first video signal and the first audio signal stored in the frame buffer 115a to the sink device 120 via the HDMI cable 200a, using the digital interface compliant with the HDMI Specification. The data transmitting unit 112b transmits the second video signal and the second audio signal stored in the frame buffer 115b to the sink device 120 via the HDMI cable 200b, using the digital interface compliant with the HDMI Specification.

When transmitting the first and second video signals as divisional video signals, the data transmitting unit 112a and 112b each add first information indicating the existence of the other divisional video signal to be combined therewith and second information for establishing synchronization with the other divisional video signal to the first and second video signals on the frame basis. The second information is formed with time code information and sequence information indicating the sequential order of the frames containing the time code indicated by the time code information, or two frames in this example.

When transmitting the first and second information, the data transmitting unit 112a and 112b each insert the first and second information of each frame into the blanking periods of the divisional video signals and transmit the first and second information. Specifically, in this embodiment, the data transmitting units 112a and 112b transmit the first information and the second information to the sink device 120, using HDMI vendor specific infoframes.

FIG. 2 shows an example structure of an HDMI vendor specific infoframe packet (hereinafter referred to as the "VSIF packet", where appropriate). This packet structure is specified in the CEA861 standard, and is not described in detail herein. This VSIF packet is formed with a packet header and a packet body. For ease of explanation, FIG. 2 shows only the structure of the packet body.

"DualLink" forming the first information is placed in the seventh bit of the fifth byte (PB5). When this one-bit information is "1", there is the other divisional video signal to be combined therewith. In other words, by setting this one-bit information to "1", the reception side can be made to recognize the existence of the other divisional video signal to be combined with the current divisional video signal, and be requested to generate a reception video signal through a combining (frame arranging) process.

The time code information is placed in the sixth byte (PB6) through the ninth byte (PB9). Here, the sixth byte, the seventh byte, the eighth byte, and the ninth byte indicate "frame", "second", "minute", and "hour", respectively, of the time code. "Even/Odd" as the sequence information is placed in the seventh bit of the tenth byte (PB10). When this one-bit information is "0", the current frame is an even-numbered (Even) frame. When this one-bit information is "1", the current frame is an odd-numbered (Odd) frame.

The sink device can recognize that there is a request for generation of a reception video signal through a combining process, from the information "DualLink" in the VSIF packet attached to each divisional video signal transmitted through the HDMI cables 200a and 200b. The sink device can also sequentially recognize the two frames having the same time code, from the time code information in the sixth through ninth bytes in the VSIF packet of each divisional video signal. The sink device then arranges the frames in the sequential order indicated by the one-bit information "Even/Odd", and generates a combined reception video signal.

Referring back to FIG. 1, the sink device 120 includes not only the above mentioned data receiving units 122a and 122b, but also a control unit 123, frame buffers 124a and 124b, a frame arranging unit 125, and a multiplier 126. The control unit 123 controls operations of the respective components of the sink device 120. The data receiving units 122a and 122b each have a digital interface compliant with the HDMI Specification, and receive video signals and audio signals from the source device 110 via the HDMI cables 200a and 200b.

The data receiving unit 122a receives the above described first video signal and the above described first audio signal from the source device 110 via the HDMI cable 200a, using the digital interface compliant with the HDMI Specification. The data receiving unit 122b receives the above described second video signal and the above described second audio signal from the source device 110 via the HDMI cable 200b, using the digital interface compliant with the HDMI Specification. As described above, the first video signal and the second video signal as divisional video signals are accompanied by the first information indicating the existence of the other divisional video signal to be combined therewith and the second information for establishing synchronization with the other divisional video signal to be combined therewith.

The frame buffer 124*a* temporarily stores the first video signal and the first audio signal received by the data receiving unit 122*a*. The frame buffer 124*b* temporarily stores the second video signal and the second audio signal received by the data receiving unit 122*b*. The frame arranging unit 125 arranges the frames, to combine the first video signal and the first audio signal stored in the frame buffer 124*a* with the second video signal and the second audio signal stored in the frame buffer 124*b*. By doing so, the frame arranging unit 125 generates a reception video signal and a reception audio signal.

At this point, the control unit 123 recognizes that the respective video signals are to be combined, and there is a request for generation of a reception video signal through a combining process, from the first information (the one-bit information "DualLink" in the VSIF packet) attached to the first and second video signals. The control unit 123 then causes the frame arranging unit 125 to start the arranging process.

The frame arranging unit 125 performs a frame arranging process to generate a reception video signal and a reception audio signal based on the second information (the time code information and the sequence information) attached to the first video signal and the second video signal. Specifically, the frame arranging unit 125 sequentially recognizes the two frames containing the same time code from the time code information in the VSIF packet, and arranges the frames in the sequential order indicated by the one-bit information "Even/Odd", to obtain a combined reception video signal and a combined reception audio signal.

The multiplier 126 multiplies the TMDS clock received by the data receiving unit 122*a* or the data receiving unit 122*b* (the data receiving unit 122*b* in this embodiment) by 2, to generate a pixel clock. This pixel clock is used for processing the reception video signal and the reception audio signal in the sink device 120.

Example Structures of the Data Transmitting Units and the Data Receiving Units

Figure 3:
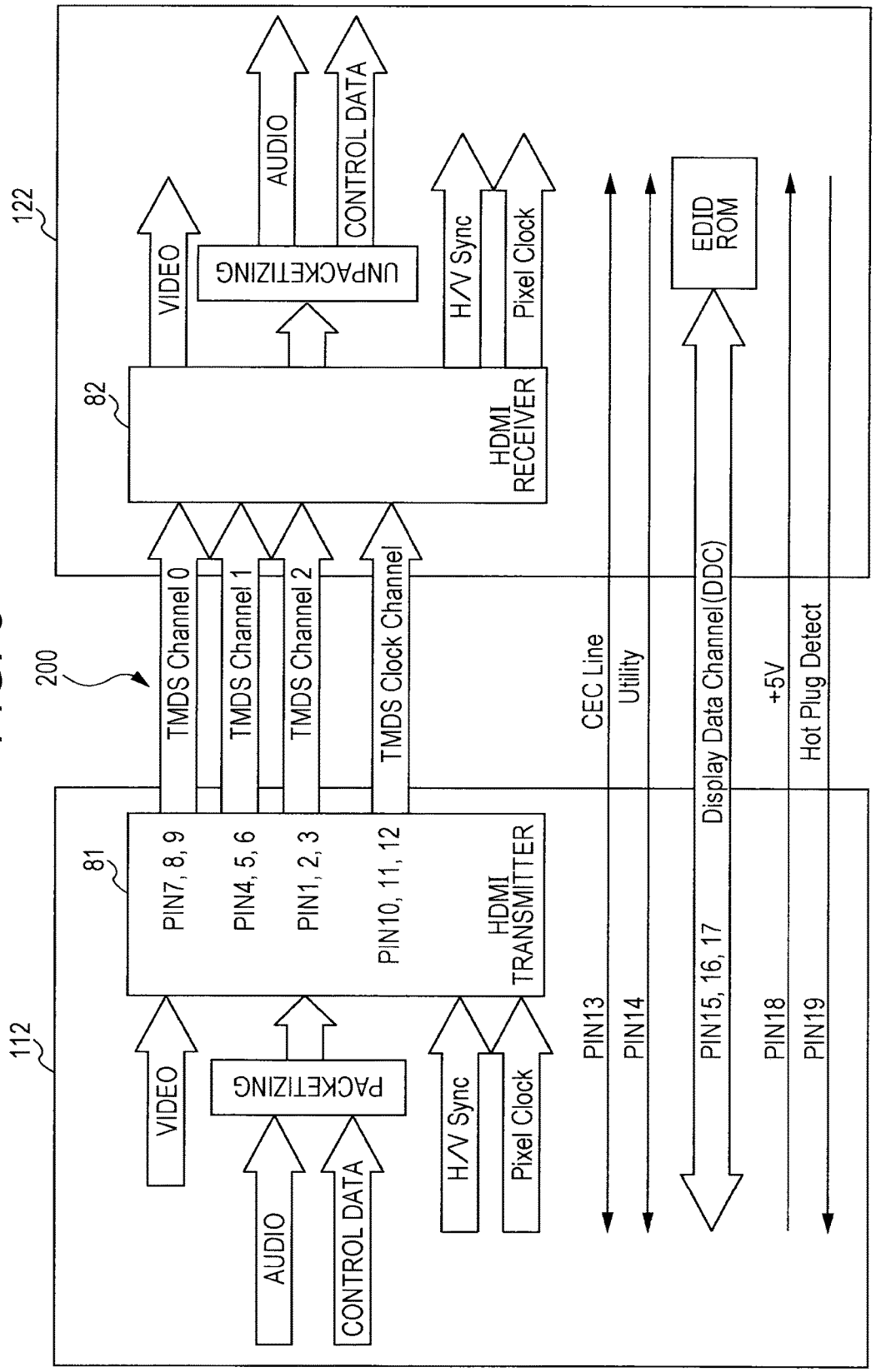
FIG. 3 is a diagram showing example structures of a data transmitting unit of a source device and a data receiving unit of a sink device.

FIG. 3 shows example structures of the data transmitting unit 112 (112*a*, 112*b*) of the source device 110 and the data receiving unit 122 (122*a*, 122*b*) of the sink device 120 in the AV system 100 shown in FIG. 1. In an effective image period (also referred to as an "active video period"), the data transmitting unit 112 unidirectionally transmits differential signals corresponding to uncompressed video data of a screen to the data receiving unit 122 through the channels.

An effective image period is a period calculated by subtracting the horizontal blanking period and the vertical blanking period from the period from one vertical synchronization signal to the next vertical synchronization signal. In a horizontal blanking period or a vertical blanking period, the data transmitting unit 112 unidirectionally transmits differential signals corresponding to at least audio data, control data, other auxiliary data, and the like accompanying video data, to the data receiving unit 122 through the channels.

In an active video period, the data receiving unit 122 receives differential signals corresponding to video data transmitted unidirectionally from the data transmitting unit 122 through the channels. In a horizontal blanking period or a vertical blanking period, the data receiving unit 122 also receives differential signals corresponding to audio data and control data transmitted unidirectionally from the data transmitting unit 112 through the channels.

The transmission channels in an HDMI system formed with the data transmitting unit 112 and the data receiving unit 122 include the following channels. First of all, the transmission channels include differential signal channels (TMDS channels and a TMDS clock channel). There are three differential signal channels for transmitting digital signals of video data and the like.

The differential signal channels are now described. As shown in FIG. 3, there are three TMDS channels #0 through #2 as the transmission channels for serially transmitting video data and audio data unidirectionally from the data transmitting unit 112 to the data receiving unit 122 in synchronization with the pixel clock. Also, there is a TMDS clock channel as the transmission channel for transmitting a TMDS clock.

An HDMI transmitter 81 of the data transmitting unit 112 converts uncompressed video data into corresponding differential signals, for example, and then serially transmits the differential signals, through the three TMDS channels #0, #1, and #2, unidirectionally to the data receiving unit 122 connected thereto via the cable 200. The HDMI transmitter 81 also converts the audio data, necessary control data, other auxiliary data, and the like accompanying the uncompressed video data into corresponding differential signals, and transmits the differential signals unidirectionally to the data receiving unit 122 through the three TMDS channels #0, #1, and #2.

Further, the HDMI transmitter 81 transmits a TMDS clock synchronized with the video data to be transmitted through the three TMDS channels #0, #1, and #2, to the data transmitting unit 122 through the TMDS clock channel. Here, through one TMDS channel #i (i=0, 1, 2), 10-bit video data is transmitted during one clock of the TMDS clock.

An HDMI receiver 82 of the data receiving unit 122 receives differential signals corresponding to video data transmitted unidirectionally from the data transmitting unit 112 through the TMDS channels #0, #1, and #2, and differential signals corresponding to audio data and control data. In this case, the reception is synchronized with the TMDS clock transmitted from the data transmitting unit 112 through the TMDS clock channel.

Other than the above described TMDS channels and the TMDS clock channel, the transmission channels of the HDMI system include transmission channels called a DDC (Display Data Channel) and a CEC line. The DDC is formed with two signal lines (not shown) included in the cable 200. The DDC is used by the data transmitting unit 112 to read E-EDID (Enhanced Extended Display Identification Data) from the data receiving unit 122.

That is, other than the HDMI receiver 82, the data receiving unit 122 includes an EDID ROM (EEPROM) that stores E-EDID that is the capability information about its own configuration/capability. In response to a request from the control unit 113, for example, the data transmitting unit 112 reads, through the DDC, the E-EDID from the data receiving unit 122 connected thereto via the cable 200.

The data transmitting unit 112 sends the read E-EDID to the control unit 113. The control unit 113 stores this E-EDID into a flash ROM or DRAM (not shown). Based on the E-EDID, the control unit 113 can recognize the settings of the configuration/capability of the data receiving unit 122. For example, the control unit 113 can determine whether the sink device 120 including the data receiving unit 122 is compatible with transmission of two divisional video signals obtained by dividing a transmission video signal by frames through transmission channels independent of each other. That is, the control unit 113 can determine whether the sink device 120 has a dual link function.

The CEC line is formed with one signal line (not shown) included in the cable 200, and is used for performing bidirectional communications of control data between the data transmitting unit 112 and the data receiving unit 122. The cable 200 also includes a line (HPD line) connected to a pin called HPD (Hot Plug Detect). The source device can use the HPD line to detect a connection with the sink device.

This HPD line is also used as a HEAC− line forming a bidirectional communication channel. The cable 200 also includes a power line (+5 V Power Line) to be used for supplying power from the source device to the sink device. The cable 200 further includes a utility line. This utility line is also used as a HEAC+ line forming a bidirectional communication channel.

Figure 4:
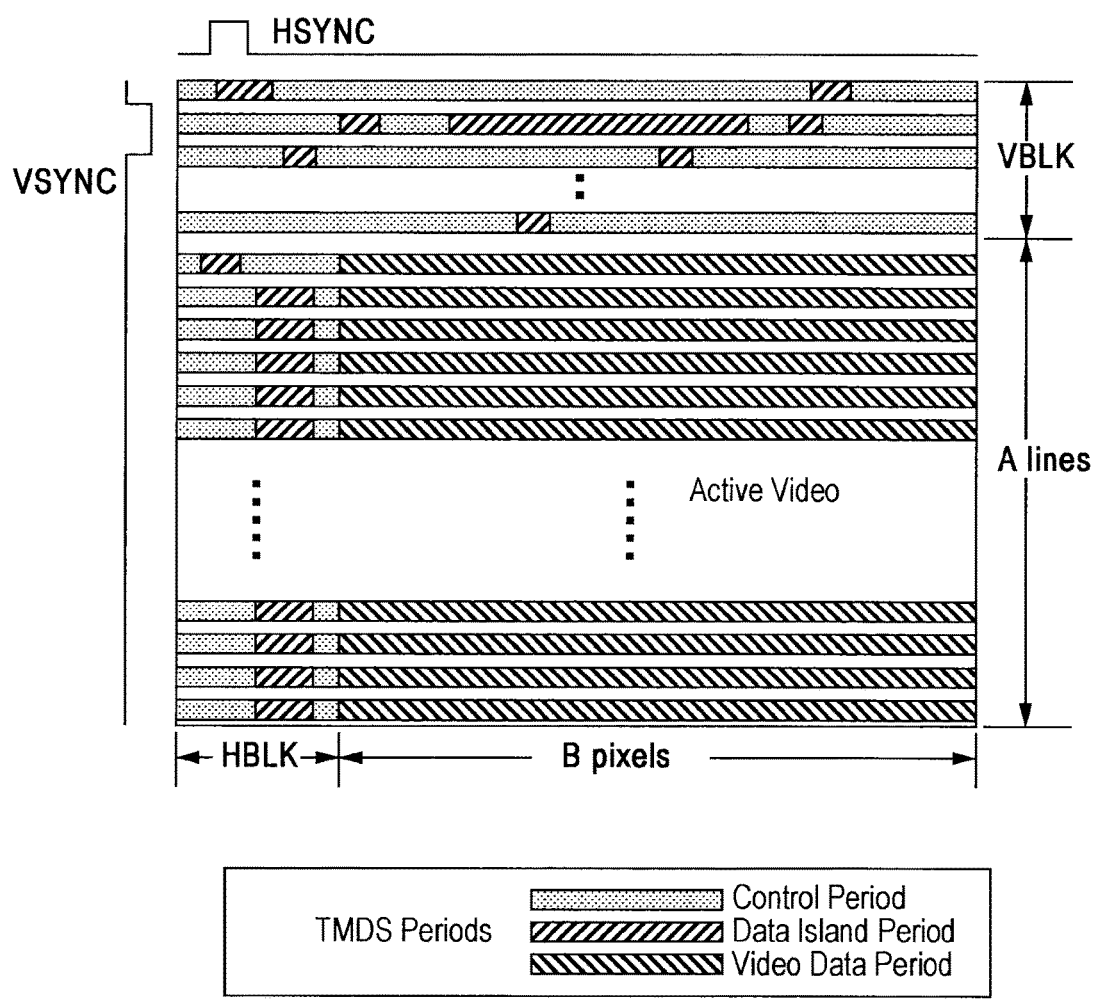
FIG. 4 is a diagram showing an example structure of TMDS transmission data.

FIG. 4 shows an example structure of TMDS transmission data. FIG. 4 illustrates periods of various kinds of transmission data in a case where image data of B pixels×A lines in size is transmitted through the TMDS channels #0 through #2. In the video field in which transmission data is transmitted through the TMDS channels of HDMIs, three kinds of periods exist depending on transmission data types. The three kinds of periods are video data periods, data island periods, and control periods.

A video field period is a period from the active edge of a vertical synchronization signal to the active edge of the next vertical synchronization signal. The video field period is divided into horizontal blanking intervals, vertical blanking intervals, and active video periods. The video data periods that are the video field period minus the horizontal blanking intervals and the vertical blanking intervals are assigned to the active video periods. In the video data periods, data of active pixels equivalent to B pixels×A lines, which constitute uncompressed image data of one screen, is transmitted.

The data island periods and the control periods are assigned to the horizontal blanking intervals and the vertical blanking intervals. In the data island periods and the control periods, auxiliary data is transmitted. That is, the data island periods are assigned to some portions of the horizontal blanking intervals and the vertical blanking intervals. In the data island periods, data unrelated to control in the auxiliary data, such as packets of audio data and the like, are transmitted. The control periods are assigned to the other portions of the horizontal blanking intervals and the vertical blanking intervals. In the control periods, data related to control in the auxiliary data, such as vertical synchronization signals, horizontal synchronization signals, control packets, and the like, are transmitted.

Referring now to FIG. 5, pin assignment (Type-A) of the receptacle 111 (111*a*, 111*b*) is described. TMDS Data #1+ and TMDS Data #i−, which are differential signals of TMDS channels #i (i=0 through 2), are transmitted through two lines that are differential lines. Pins (pins with pin numbers 7, 4, and 1) are assigned to TMDS Data #i+, and pins (pins with pin numbers 9, 6, and 3) are assigned to TMDS Data #i−. Pins with pin numbers 8, 5, and 2 are assigned to TMDS Data #1 Shield (i=0 through 2).

TMDS Clock+ and TMDS Clock−, which are differential signals of the TMDS clock channel, are transmitted through two lines that are differential lines. The pin with pin number 10 is assigned to TMDS Clock+, and the pin with pin number 12 is assigned to TMDS Clock−. The pin with pin number 11 is assigned to TMDS Clock Shield.

A CEC signal that is control data is transmitted through the CEC line. The pin with pin number 13 is assigned to the CEC signal. An SDA (Serial Data) signal such as E-EDID is transmitted through an SDA line. The pin with pin number 16 is assigned to the SDA signal. An SCL (serial Clock) signal that is the clock signal to be used for synchronization at the time of transmission/reception of the SDA signal is transmitted through an SCL line. The pin with pin number 15 is assigned to the SCL. The above described DDC line is formed with the SDA line and the SCL line.

The pin with pin number 19 is assigned to HPD/HEAC−. The pin with pin number 14 is assigned to Utility/HEAC+. The pin with pin number 17 is assigned to DDC/CEC Ground/HEAC Shield. Further, the pin with pin number 18 is assigned to the power supply (+5 V Power).

[Operations of the AV System]

Operations of the AV system 100 shown in FIG. 1 are now described. The control unit 113 of the source device 110 determines whether the sink device 120 has a dual link function in advance. Here, having a dual link function is being compatible with transmission of two divisional video signals obtained by dividing a transmission video signal by frames through transmission channels (HDMI interfaces) independent of each other. After the determination, the control unit 113 controls the respective components of the source device 110 so that a transmitting operation compatible with the dual link function described below can be performed.

For example, the control unit 113 performs the determining operation based on E-EDID read by the data transmitting unit 112 (112*a*, 112*b*) from the sink device 120 as described above. Also, the control unit 113 performs the determination by communicating with the control unit 123 of the sink device 120 via the HDMI cable 200 (200*a*, 200*b*). This communication can be performed by using the bidirectional communication channels formed with the above described HPD line (HEAC− line) and the utility line (HEAC+ line). This communication can also be performed by using the above described CEC line.

Figure 6:
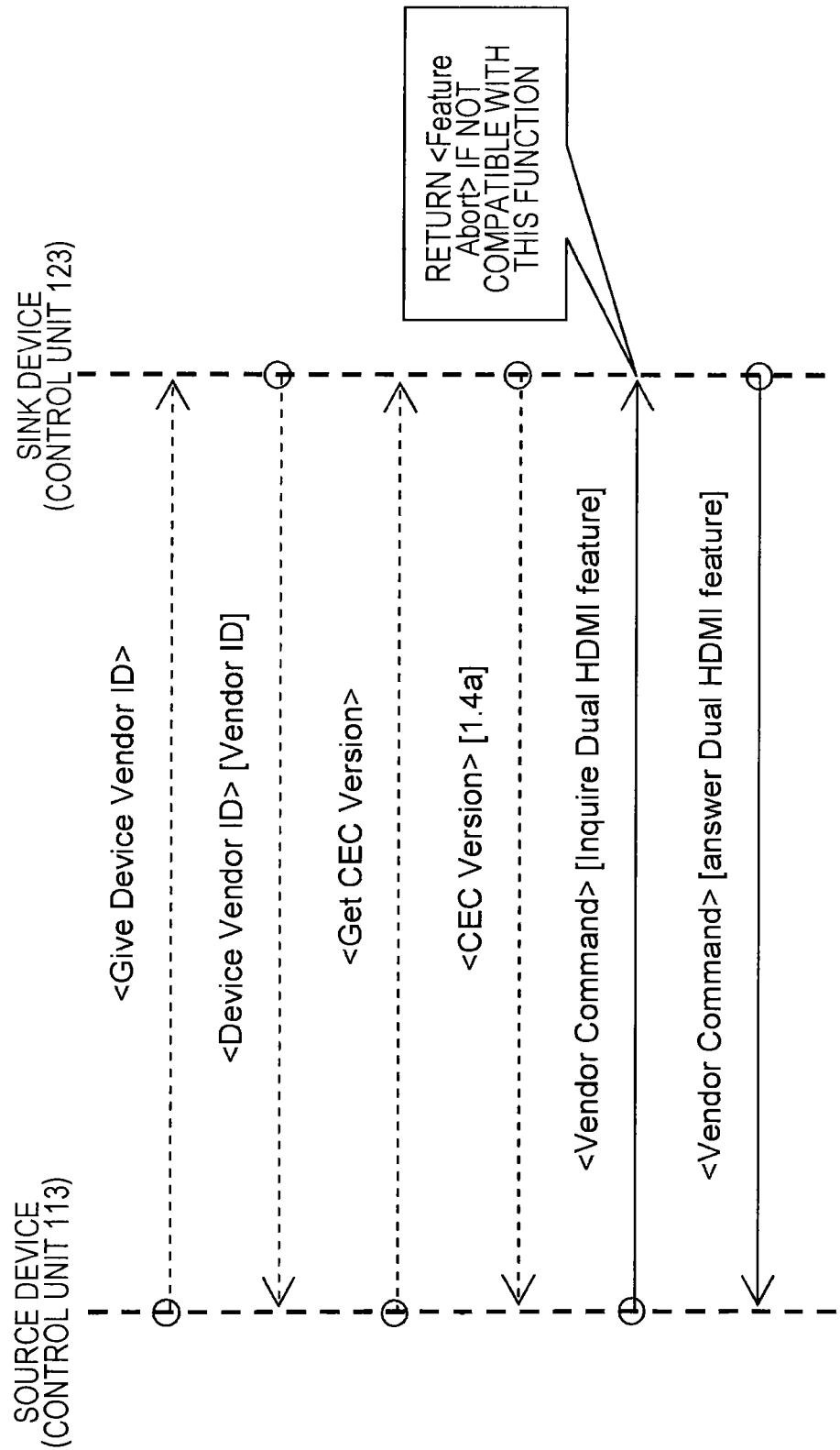
FIG. 6 is a diagram showing an example of a determination method using vendor commands through the CEC line.

FIG. 6 shows an example of a determination method using vendor commands through the CEC line. In response to transmission of <Get Device Vendor ID> from the control unit 113, <Device Vendor ID>[Vendor ID] is sent from the control unit 123. Accordingly, the control unit 113 can recognize [Vendor ID] of the sink device 120. Also, in response to transmission of <Get CEC Version> from the control unit 113, <CEC Version> [1.4a] is sent from the control unit 123. Accordingly, the control unit 113 can recognize [CEC Version] of the sink device 120. The respective commands <Get Device Vendor ID>, <Device Vendor ID>[Vendor ID], <Get CEC Version>, and <CEC Version> [1.4a] might be exchanged by some other method, and therefore, are not necessarily required. Further, <Vendor Command> may be transmitted as <Vendor Command with ID> [Vendor ID].

The control unit 113 also transmits the command <Vendor Command> [Inquiry Dual HDMI function], to request the control unit 123 to send a response as to whether the sink device is compatible with the dual link function. If the sink device 120 is compatible with the dual link function, the control unit 123 transmits <Vendor Command> [answer Dual HDMI function]. Accordingly, the control unit 113 can recognize that the sink device 120 is compatible with the dual link function.

If the sink device 120 is not compatible with the dual link function, the control unit 123 returns a <Feature Abort> command. If the control unit 123 cannot understand the command <Vendor Command> [Inquiry Dual HDMI function] and does not return any response, the control unit 113 also determines that the sink device 120 is not compatible with the dual link function. The above sequence is defined in the existing HDMI Specification, and compliance with the standards is not degraded by an applied implementation of this sequence.

Operations compatible with the dual link function in the AV system 100 shown in FIG. 1 are described below. First, the operation of the source device 110 is described. The video signal (image data) and the audio signal (audio data) to be transmitted are supplied to the frame dividing unit 114. The format of this video signal is 4K×2K/60 Hz progressive. The frame dividing unit 114 divides the video signal (image data) and the audio signal (audio data) into frames or into odd-numbered frames and even-numbered frames on the frame basis.

As a result of the frame dividing process, a first video signal formed with odd-numbered frames and a first audio signal corresponding to the first video signal, and a second video signal formed with even-numbered frames and a second audio signal corresponding to the second video signal are obtained. In this case, the first video signal and the second video signal are video signals of 4K×2K/30 Hz progressive, and each of the video signals can be transmitted in the transmission band of one HDMI cable.

The first video signal and the first audio signal obtained by the frame dividing unit 114 are temporarily stored in the frame buffer 115a. Also, the second video signal and the second audio signal obtained by the frame dividing unit 114 are temporarily stored in the frame buffer 115b. The above described pixel clock synchronized with the video signal to be transmitted is supplied to the demultiplier 116. The demultiplier 116 demultiplies the pixel clock by ½, to generate a TMDS clock. This TMDS clock is supplied to the data transmitting units 112a and 112b.

The data transmitting unit 112a transmits the first video signal and the first audio signal stored in the frame buffer 115a to the sink device 120 via the HDMI cable 200a, using a digital interface compliant with the HDMI Specification. In this case, for each frame, the first information indicating the existence of the other divisional video signal to be combined therewith and the second information (the time code information and the sequence information) for establishing synchronization with the other divisional video signal to be combined therewith are attached to the first video signal.

The data transmitting unit 112b transmits the second video signal and the second audio signal stored in the frame buffer 115b to the sink device 120 via the HDMI cable 200b, using a digital interface compliant with the HDMI Specification. In this case, for each frame, the first information indicating the existence of the other divisional video signal to be combined therewith and the second information (the time code information and the sequence information) for establishing synchronization with the other divisional video signal to be combined therewith are attached to the second video signal.

Next, the operation of the sink device 120 is described. The data receiving unit 122a receives the first video signal and the first audio signal from the source device 110 via the HDMI cable 200a, using a digital interface compliant with the HDMI Specification. Likewise, the data receiving unit 122b receives the second video signal and the second audio signal from the source device 110 via the HDMI cable 200b, using a digital interface compliant with the HDMI Specification.

The first video signal and the first audio signal received by the data receiving unit 122a are temporarily stored in the frame buffer 124a. Likewise, the second video signal and the second audio signal received by the data receiving unit 122b are temporarily stored in the frame buffer 124b.

The control unit 123 recognizes that the respective video signals are to be combined, and there is a request for generation of a reception video signal through a combining process, from the first information (the information "DualLink" in the VSIF packet) attached to the first and second video signals (divisional video signals). As a result, the control unit 123 causes the frame arranging unit 125 to start the arranging process.

The frame arranging unit 125 combines the first video signal and the first audio signal stored in the frame buffer 124a with the second video signal and the second audio signal stored in the frame buffer 124b. By doing so, the frame arranging unit 125 generates a reception video signal and a reception audio signal. In this case, the frame arranging unit 125 sequentially recognizes the two frames having the same time code from the time code information in the VSIF packet, and arranges the frames in the sequential order indicated by the one-bit information "Even/Odd" in the VSIF packet, to combine the signals.

The TMDS clock received by the data receiving unit 122b is supplied to the multiplier 126. The multiplier 126 multiplies the TMDS clock by 2, to generate a pixel clock. The pixel clock is used for processing the reception video signal and the reception audio signal in the sink device 120.

As described above, in the AV system 100 shown in FIG. 1, the source device 110 divides a high-definition video signal (a 4K×2K/60 Hz progressive video signal) into two signals. The respective divisional video signals (the first video signal and the second video signal) are sent to the sink device 120 through different HDMI interfaces. In this manner, a high-definition video signal that requires a wider transmission band than the transmission band of one HDMI interface can be appropriately transmitted from the source device 110 to the sink device 120.

At this point, for each frame, the first information indicating the existence of the other divisional video signal to be combined therewith and the second information for establishing synchronization with the other divisional video signal to be combined therewith are attached to each of the divisional video signals. Accordingly, the frames of the respective divisional video signals (the first video signal and the second video signal) transmitted through different HDMI interfaces can be easily arranged to generate a reception video signal in the sink device 120. In other words, the sink device 120 can recognize the respective divisional video signals (the first video signal and the second video signal) transmitted through different HDMI interfaces as the signals to be combined, and can appropriately combine the respective divisional video signals by performing a frame arranging process based on the second information.

In the AV system 100 shown in FIG. 1, the source device 110 determines whether the sink device 120 has the dual link function. After that, the source device 110 divides a high-definition video signal (4K×2K/60 Hz progressive) into two signals, and transmits the respective divisional video signals to the sink device 120 via different HDMI interfaces. Accordingly, the source device 110 can be prevented from dividing a high-definition video signal and transmitting the divided high-definition video signal to the sink device 120 via two HDMI interfaces though the sink device 120 does not have the dual link function.

In the above described embodiment, the one-bit information "DualLink" in the VSIF packet is the first information or the information indicating the existence of the other divisional video signal to be combined therewith. However, the VSIF packet may be the first information. The control unit 123 of the sink device 120 can recognize the existence of the other divisional video signal to be combined therewith by sensing transmission of the VSIF packet.

2. Modifications

In the above described embodiment, the sink device 120 has two ports (receptacles) for connecting HDMI cables thereto. However, a sink device may have three or more ports.

Figure 7:
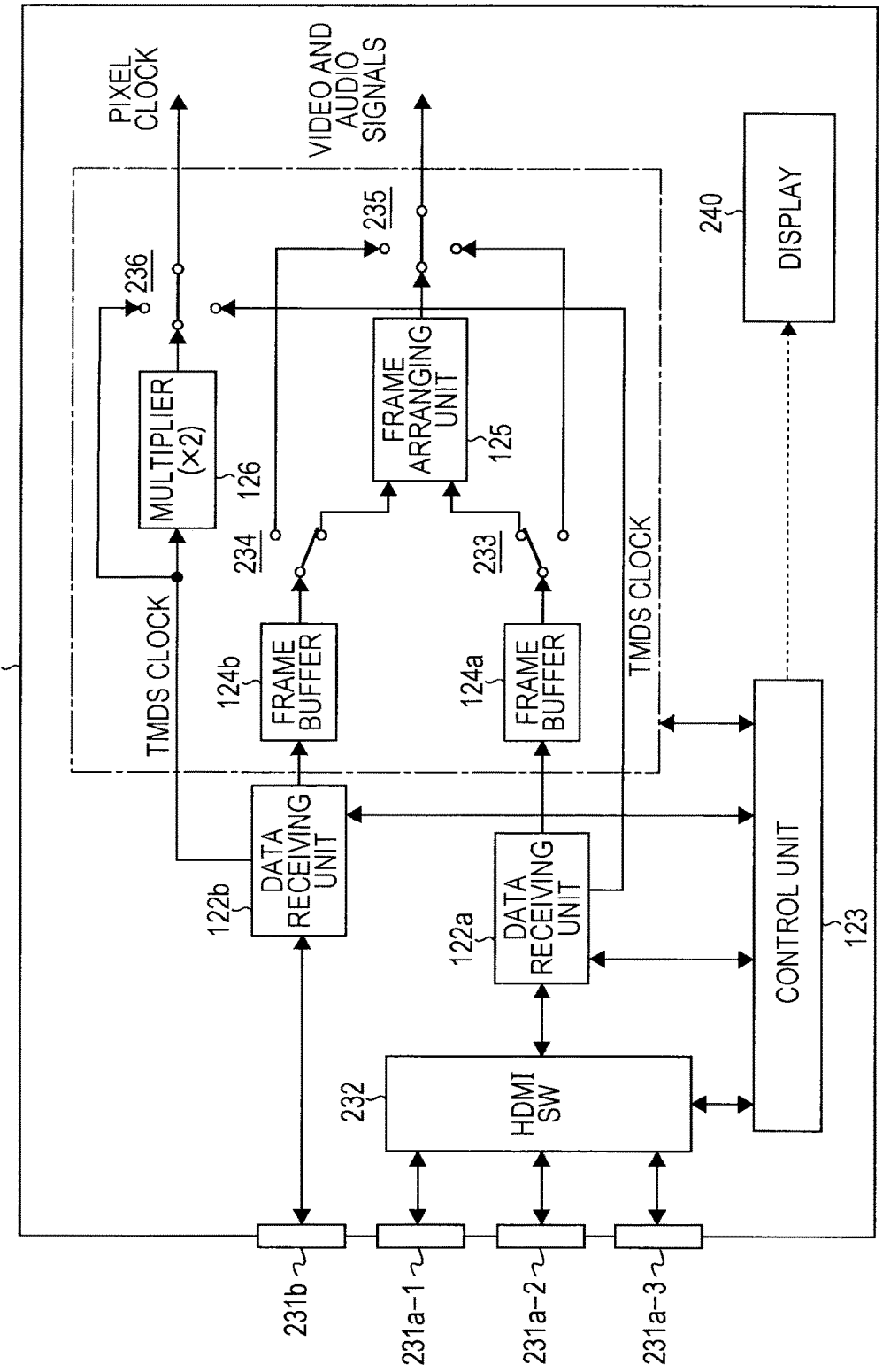
FIG. 7 is a block diagram showing an example structure of a sink device having four ports.

FIG. 7 shows an example structure of a sink device 120A in such a case. In FIG. 7, the same components as those shown in FIG. 1 are denoted by the same reference numerals as those used in FIG. 1, and explanation of them is not repeated herein. The sink device 120A has four ports 231a-1, 231a-2, 231a-3, and 231b. The port 231b is connected to the data receiving unit 122b. The ports 231a-1, 231a-2, and 231a-3 are selectively connected to the data receiving unit 122a via an HDMI switcher 232.

This sink device 120A also includes selector switches 233, 234, 235, and 236. The selector switch 233 supplies the video signal stored in the frame buffer 124a selectively to the frame arranging unit 125 or the selector switch 235. The selector switch 234 supplies the video signal stored in the frame buffer 124b selectively to the frame arranging unit 125 or the selector switch 235.

The selector switch 235 selectively outputs a reception video signal and a reception audio signal that are the video signal and the audio signal supplied from the selector switch 233, the selector switch 234, or the frame arranging unit 125. The selector switch 236 selectively outputs a pixel clock that is the TMDS clock received by the data receiving unit 122a, the TMDS clock received by the data receiving unit 122b, or the clock obtained by the multiplier 126 multiplying a TMDS clock by 2.

When content supplied from the source device connected to the port 231b is viewed in the sink device 120A shown in FIG. 7, the following situations are observed. The data receiving unit 122b connected to the port 231b is selected, and the HDMI switcher 232 connected to the ports 231a-1, 231a-2, and 231a-3, and the data receiving unit 122a are put into a non-operating state.

At this point, the selector switch 234 selects the line connected to the selector switch 235, and the selector switch 235 selects the video signal and the audio signal supplied from the selector switch 234. That is, the video signal and the audio signal received by the data receiving unit 122b are output as a reception video signal and a reception audio signal. In this case, the TMDS clock received by the data receiving unit 122b is output as a pixel clock from the selector switch 236.

When content supplied from the source device connected to the ports 231a-1, 231a-2, and 231a-3 is viewed in the sink device 120A shown in FIG. 7, the following situations are observed. The HDMI switcher 232 connected to the ports 231a-1, 231a-2, and 231a-3, and the data receiving unit 122a are selected, and the data receiving unit 122b connected to the port 231b is put into a non-operating state.

At this point, the selector switch 233 selects the line connected to the selector switch 235, and the selector switch 235 selects the video signal and the audio signal supplied from the selector switch 233. That is, the video signal and the audio signal received by the data receiving unit 122a are output as a reception video signal and a reception audio signal. In this case, the TMDS clock received by the data receiving unit 122a is output as a pixel clock from the selector switch 236.

As described above, in a normal usage state, the data receiving unit 122b, or the HDMI switcher and the data receiving unit 122a are exclusively selected and are put into an operating state.

Next, a case where the dual link function is used is described. In this case, the port 231b and a connected one of the ports 231a-1, 231a-2, and 231a-3 are activated, and control is performed so that the outputs of the respective frame buffers 124b and 124a are connected to the frame arranging unit 125. That is, the selector switches 233 and 234 are controlled to select the frame arranging unit 125. In this case, the reception video signal and the reception audio signal obtained by combining signals at the frame arranging unit 125 are output from the selector switch 235. Also, at the selector switch 236, the output of the multiplier 126 is selected, and the output of the multiplier 126 is output as a pixel clock.

Figure 8:
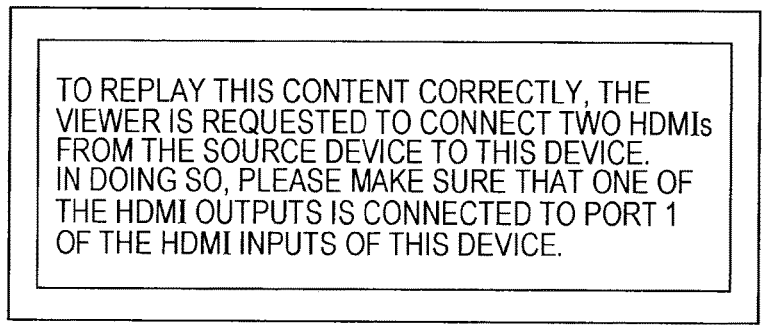
FIG. 8 is a diagram showing an example of a message (connection correction display) to be displayed on the display of a sink device.

In the case where the dual link function is used as described above, one of the two HDMI cables needs to be connected to the port 231b. If either of the two HDMI cables extending from the source device is not connected to the port 231b at this point, the control unit 123 may display the message (connection correction display) shown in FIG. 8 on a display 240 of the sink device 120A, for example. When the HDMI cables are connected in a wrong manner, the user can correct the connection based on this message.

Figure 9:
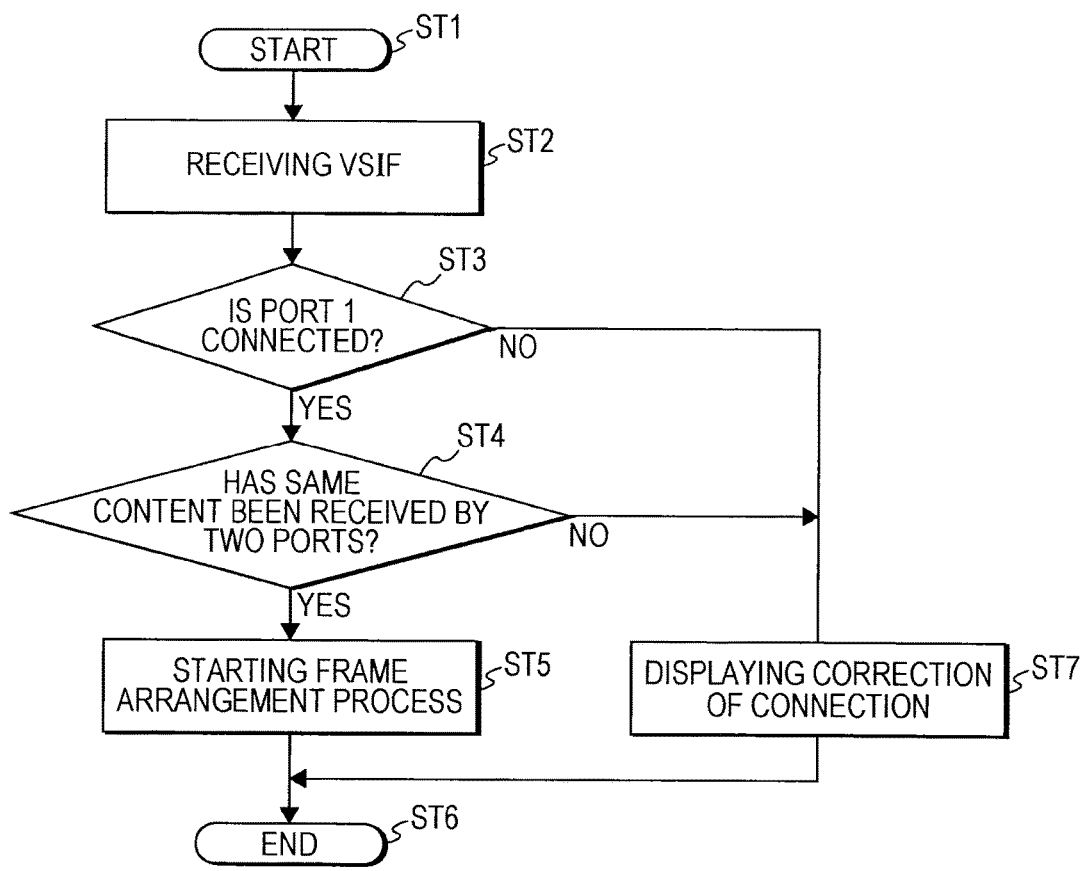
FIG. 9 is a flowchart showing an example of the flow of control to be performed by the control unit of a sink device.

The flowchart in FIG. 9 shows an example of the flow of control to be performed by the control unit 123 in that case. In step ST1, the control unit 123 starts a control operation. In step ST2, the control unit 123 recognizes that a VSIF packet is received by the data receiving unit 122b or the data receiving unit 122a, and the reception video signal is to be processed with the dual link function.

In step ST3, the control unit 123 determines whether an HDMI cable is connected to Port 1 or the port 231b. When there is an HDMI cable connected, the control unit 123 in step ST4 determines whether video signals of the same content have been received at two ports. When such video signals have been received, the control unit 123 in step ST5 causes a frame arranging process to be started, and in step ST6, ends the control operation.

If any HDMI cable is not connected to Port 1 or the port 231b in step ST3, or if video signals of the same content to be combined have not been received at two ports in step ST4, the control unit 123 moves on to the procedure of step ST7. In step ST7, the control unit 123 displays the message to prompt connection correction (connection correction display) on the display 240, and in step ST6, ends the control operation.

When the source device 110 checks the dual link function of the sink device 120 as described above, the content of the corresponding port number may be included. Accordingly, when there is no connection to the port (231b), the source device can prompt the user to correct the connection by sending a video signal to display the message shown in FIG. 8 to another port connected to the sink device such as Port 2 (the port 231a-1), for example.

In the case of the sink device 120A shown in FIG. 7, the ports 231a-1, 231a-2, and 231a-3 are selectively connected to the data receiving unit 122a via the HDMI switcher 232. That is, the data receiving unit 122a is shared among the three ports 231*a*-1, 231*a*-2, and 231*a*-3 for reception, and the circuit size can be reduced accordingly.

In the above described embodiment, the source device 110 divides a video signal to be transmitted into two signals, and transmits the respective divisional video signals to the sink device through different HDMI interfaces (HDMI cables). However, a video signal may be divided into three or more prior to transmission, depending on the transmission band required by the video signal to be transmitted.

Also, in the above described embodiment, the source device 110 includes two frame buffers and two data transmitting units, but may include only one each if operated in a segmented manner in terms of time.

Also, in the above described embodiment, the transmission video signal is a high-definition video signal (a 4K×2K/ 60 Hz progressive video signal). However, preferred transmission video signals according to the present technique are not limited to that, and include high-definition video signals of other formats, video signals each including a left-eye image signal and a right-eye image signal to obtain a stereoscopic image, and the like. In short, the present technique is effective in cases where a video signal that requires a wider transmission band than the transmission band of one transmission channel (such as an HDMI interface) is transmitted from a source device to a sink device.

Also, in the above described embodiment, the present technique is applied to an AV system in which a source device and a sink device are connected by digital interfaces compliant with the HDMI Specification. However, the present technique is not limited to that, and can of course be applied to an AV system in which devices are connected by digital (wireless or cable) interfaces compliant to other similar standards.

The present technique may also be embodied in the structures described below.

(1) A transmission device including:

a frame dividing unit that obtains divisional video signals generated by dividing a transmission video signal by frames; and a data transmitting unit that transmits the divisional video signals obtained by the frame dividing unit to an external device via transmission channels independent of one another, the data transmitting unit adding first information and second information for each frame to the divisional video signals and transmitting the divisional video signals, the first information indicating the existence of the other divisional video signal to be combined therewith, the second information being for establishing synchronization with the other divisional video signal to be combined therewith.

(2) The transmission device of (1), wherein the second information is formed with time code information and sequence information indicating sequential order of the frames having the time code indicated by the time code information.

(3) The transmission device of (1) or (2), wherein the data transmitting unit transmits the divisional video signals to the external device via the transmission channels, using differential signals through a predetermined number of channels.

(4) The transmission device of (3), wherein the data transmitting unit inserts the first information and the second information for each frame into blanking periods of the divisional video signals and transmitting the first information and the second information.

(5) The transmission device of (3) or (4), wherein the data transmitting unit has a digital interface compliant with the HDMI Specification.

(6) The transmission device of any of (1) through (5), wherein the data transmitting unit includes a first data transmitting unit and the second data transmitting unit, and the frame dividing unit divides the transmission video signal into two divisional video signals.

(7) The transmission device of (6), wherein the format of the transmission video signal is 4K×2K/60 Hz progressive.

(8) The transmission device of any of (1) through (7), further including a function determining unit that determines whether the external device is compatible with transmission of the divisional video signals generated by dividing the transmission video signal by frames through the transmission channels independent of one another.

(9) The transmission device of (8), wherein the function determining unit determines whether the external device is compatible with the transmission based on capability information about the external device, the capability information being read from the external device through the transmission channels.

(10) The transmission device of (8), wherein the function determining unit determines whether the external device is compatible with the transmission by communicating with the external device via the transmission channels.

(11) A transmission method including:

a frame dividing step of obtaining divisional video signals generated by dividing a transmission video signal by frames; and a data transmitting step of transmitting the divisional video signals obtained in the frame dividing step to an external device via transmission channels independent of one another, the data transmitting step including adding first information and second information for each frame to the divisional video signals and transmitting the divisional video signals, the first information indicating the existence of the other divisional video signal to be combined therewith, the second information being for establishing synchronization with the other divisional video signal to be combined therewith.

(12) A reception device including a data receiving unit that receives divisional video signals from an external device via transmission channels independent of one another, the divisional video signals being generated by dividing a video signal by frames, the divisional video signals being accompanied by first information and second information for each frame, the first information indicating the existence of the other divisional video signal to be combined therewith, the second information being for establishing synchronization with the other divisional video signal to be combined therewith, the reception device further including a frame arranging unit that obtains a reception video signal by arranging the divisional video signals received by the data receiving unit in frame order based on the first information and the second information.

(13) The reception device of (12), wherein the second information is formed with time code information and sequence information indicating sequential order of the frames having the time code indicated by the time code information.

(14) The reception device of (12) or (13), wherein the data receiving unit receives the divisional video signals from the external device via the transmission channel, using differential signals through a predetermined number of channels.

(15) The reception device of (14), wherein the first information and the second information for each frame are inserted into blanking periods of the divisional video signals.

(16) The reception device of (14) or (15), wherein the data receiving unit has a digital interface compliant with the HDMI Specification.

(17) The reception device of any of (12) through (16), further including:

ports to which the transmission channels for transmitting the divisional video signals are connected; and a display control unit that performs connection correction display when the transmission channels for transmitting the divisional video signals are not connected to the respective ports.

(18) The reception device of any of (12) through (17), wherein the data receiving unit includes a first data receiving unit and a second data receiving unit, and the reception device further includes:

a first port to which the first data receiving unit is connected; and second ports to which the second data receiving unit is selectively connected via a switcher.

(19) A reception method including a data receiving step of receiving divisional video signals from an external device via transmission channels independent of one another, the divisional video signals being generated by dividing a video signal by frames, the divisional video signals being accompanied by first information and second information for each frame, the first information indicating the existence of the other divisional video signal to be combined therewith, the second information being for establishing synchronization with the other divisional video signal to be combined therewith, the reception method further including a frame arranging step of obtaining a reception video signal by arranging the divisional video signals received in the data receiving step in frame order based on the first information and the second information.

(20) A transmission/reception system including a transmission system and a reception system connected to each other via a transmission channel, the transmission device including:

a frame dividing unit that obtains divisional video signals generated by dividing a transmission video signal by frames; and a data transmitting unit that transmits the divisional video signals obtained by the frame dividing unit to the reception device via transmission channels independent of one another, the data transmitting unit adding first information and second information for each frame to the divisional video signals and transmitting the divisional video signals, the first information indicating the existence of the other divisional video signal to be combined therewith, the second information being for establishing synchronization with the other divisional video signal to be combined therewith, the reception device including:

a data receiving unit that receives the divisional video signals from the transmission device via the transmission channels independent of one another; and a frame arranging unit that obtains a reception video signal by arranging the divisional video signals received by the data receiving unit in frame order based on the first information and the second information.

REFERENCE SIGNS LIST

100 AV system
110 Source device
111a, 111b Receptacle
112a, 112b Data transmitting unit
113 Control unit
114 Frame dividing unit
115a, 115b Frame buffer
116 Demultiplier
120, 120A Sink device
121a, 121b Receptacle
122a, 122b Data receiving unit
123 Control unit
124a, 124b Frame buffer
125 Frame arranging unit
126 multiplier
200a, 200b HDMI cable
231b, 231a-1, 231a-2, 231a-3 Port
232 HDMI switcher
233-236 Selector switch
240 Display

The invention claimed is:

1. A transmission device, comprising:

a frame dividing unit configured to generate a plurality of divisional video data packages comprising at least a first divisional video data package and a second divisional video data package, wherein the plurality of divisional video data packages are generated by division of a transmission video data package based on a plurality of frames, wherein the first divisional video data package is generated based on odd-numbered frames of the plurality of frames, and wherein the second divisional video data package is generated based on even-numbered frames of the plurality of frames; and a data transmitting unit configured to:

add, for each of the plurality of frames, first information and second information to the plurality of divisional video data packages, and transmit, via transmission channels, the plurality of divisional video data packages along with the first information and the second information to an external device, wherein each of the transmission channels is independent, wherein the first information indicates existence of a different divisional video data package, wherein the different divisional video data package is combined with each of the first divisional video data package and the second divisional video data package based on the first information, wherein the second information indicates establishment of synchronization with the different divisional video data package, and wherein the different divisional video data package is synchronized with each of the first divisional video data package and the second divisional video data package based on the second information.

2. The transmission device according to claim 1, wherein the second information is based on time code information of the plurality of frames and sequence information, wherein the sequence information indicates a sequential order of the plurality of frames, and
wherein each of the plurality of frames comprises a time code indicated by the time code information.

3. The transmission device according to claim 1,
wherein the data transmitting unit is further configured to transmit the plurality of divisional video data packages based on differential data packages via a specific number of the transmission channels, and
wherein the differential data packages are based on conversion of the plurality of divisional video data packages that are in uncompressed form.

4. The transmission device according to claim 3,
wherein the data transmitting unit is further configured to insert the first information and the second information of each of the plurality of frames into blanking periods of the plurality of divisional video data packages.

5. The transmission device according to claim 3,
wherein the data transmitting unit comprises a digital interface that is compliant with an HDMI (High Definition Multimedia Interface) Specification.

6. The transmission device according to claim 1, wherein the data transmitting unit includes a first data transmitting unit and a second data transmitting unit.

7. The transmission device according to claim 6,
wherein a format of the transmission video data package is 4K×2K/60 Hz progressive.

8. The transmission device according to claim 1, further comprising a function determining unit configured to determine compatibility of the external device with the transmission of the plurality of divisional video data packages.

9. The transmission device according to claim 8,
wherein the function determining unit is further configured to determine the compatibility of the external device based on capability information associated with the external device,
wherein the capability information corresponds to a configuration of the external device, and
wherein the capability information is read from the external device via the transmission channels.

10. The transmission device according to claim 8,
wherein the function determining unit is further configured to determine the compatibility of the external device based on a communication with the external device via the transmission channels.

11. A transmission method, comprising:
generating a plurality of divisional video data packages comprising at least a first divisional video data package and a second divisional video data package,
  wherein the plurality of divisional video data packages are generated by dividing a transmission video data package based on a plurality of frames,
  wherein the first divisional video data package is generated based on odd-numbered frames of the plurality of frames, and
  wherein the second divisional video data package is generated based on even-numbered frames of the plurality of frames;
adding, for each of the plurality of frames, first information and second information to the plurality of divisional video data package; and
transmitting, via transmission channels, the plurality of divisional video data packages along with the first information and the second information to an external device, wherein each of the transmission channels is independent, wherein the first information indicates existence of a different divisional video data package,
wherein the different divisional video data package is combined with each of the first divisional video data package and the second divisional video data package based on the first information,
wherein the second information indicates establishment of synchronization with the different divisional video data package, and
wherein the different divisional video data package is synchronized with each of the first divisional video data package and the second divisional video data package based on the second information.

12. A reception device, comprising:
a data receiving unit configured to receive a plurality of divisional video data packages comprising at least a first divisional video data package and a second divisional video data package, from an external device via transmission channels, wherein each of the transmission channels is independent,
  wherein the external device generates the plurality of divisional video data packages by division of a video data package based on a plurality of frames,
  wherein the first divisional video data package is generated based on odd-numbered frames of the plurality of frames,
  wherein the second divisional video data package is generated based on even-numbered frames of the plurality of frames,
  wherein the external device transmits, via the transmission channels, first information and second information along with the plurality of divisional video data packages for each of the plurality of frames,
  wherein the first information indicates existence of a different divisional video data package,
  wherein the different divisional video data package is combined with each of the first divisional video data package and the second divisional video data package based on the first information,
  wherein the second information indicates establishment of synchronization with the different divisional video data package, and
  wherein the different divisional video data package is synchronized with each of the first divisional video data package and the second divisional video data package based on the second information, and
a frame arranging unit configured to generate a reception video data package by arrangement of the plurality of divisional video data packages in a frame order,
  wherein the arrangement of the plurality of divisional video data packages in the frame order is based on the first information and the second information.

13. The reception device according to claim 12,
wherein the second information is based on time code information of the plurality of frames and sequence information,
wherein the sequence information indicates a sequential order of the plurality of frames, and
wherein each of the plurality of frames comprises a time code indicated by the time code information.

14. The reception device according to claim 12,
wherein the data receiving unit is further configured to receive the plurality of divisional video data packages based on differential data packages via a specific number of the transmission channels, and wherein the differential data packages are based on conversion of the plurality of divisional video data packages that are in uncompressed form.

15. The reception device according to claim 14, wherein the first information and the second information of each of the plurality of frames are inserted into blanking periods of the plurality of divisional video data packages.

16. The reception device according to claim 14, wherein the data receiving unit comprises a digital interface compliant with an HDMI (High Definition Multimedia Interface) Specification.

17. The reception device according to claim 12, further comprising:
a plurality of ports, wherein the transmission channels for transmission of the plurality of divisional video data packages are connected to the plurality of ports; and
a display control unit configured to control a display screen to display a connection correction message based on detection of a wrong connection of at least one of the plurality of ports with the transmission channels.

18. The reception device according to claim 12, wherein the data receiving unit includes a first data receiving unit and a second data receiving unit, and wherein the reception device further comprises:
a first port connected with the first data receiving unit; and
a plurality of second ports selectively connected with the second data receiving unit via a switcher.

19. A reception method, comprising:
receiving a plurality of divisional video data packages comprising at least a first divisional video data package and a second divisional video data package, from an external device via transmission channels, wherein each of the transmission channels is independent,
wherein the external device generates the plurality of divisional video data packages by dividing a video data package based on a plurality of frames,
wherein the first divisional video data package is generated based on odd-numbered frames of the plurality of frames,
wherein the second divisional video data package is generated based on even-numbered frames of the plurality of frames,
wherein the external device transmits, via the transmission channels, first information and second information along with the plurality of divisional video data packages for each of the plurality of frames,
wherein the first information indicates existence of a different divisional video data package,
wherein the different divisional video data package is combined with each of the first divisional video data package and the second divisional video data package based on the first information,
wherein the second information indicates establishment of synchronization with the different divisional video data package, and
wherein the different divisional video data package is synchronized with each of the first divisional video data package and the second divisional video data package based on the second information, and
generating a reception video data package by arranging the plurality of divisional video data packages in a frame order,
wherein the arrangement of the plurality of divisional video data packages in the frame order is based on the first information and the second information.

20. A transmission and reception system, comprising:
a transmission device; and
a reception device connected to the transmission device via transmission channels,
wherein the transmission device includes:
a frame dividing unit configured to
generate a plurality of divisional video data packages comprising at least a first divisional video data package and a second divisional video data package,
wherein the plurality of divisional video data packages are generated by division of a transmission video data package based on a plurality of frames,
wherein the first divisional video data package is generated based on odd-numbered frames of the plurality of frames, and
wherein the second divisional video data package is generated based on even-numbered frames of the plurality of frames; and
a data transmitting unit configured to:
add, for each of the plurality of frames, first information and second information to the plurality of divisional video data packages, and
transmit, via the transmission channels, the plurality of divisional video data packages along with the first information and the second information to the reception device,
wherein each of the transmission channels is independent,
wherein the first information indicates existence of a different divisional video data package,
wherein the different divisional video data package is combined with each of the first divisional video data package and the second divisional video data package based on the first information,
wherein the second information indicates establishment of synchronization with the different divisional video data package, and
wherein the different divisional video data package is synchronized with each of the first divisional video data package and the second divisional video data package based on the second information, and
wherein the reception device includes:
a data receiving unit configured to receive the plurality of divisional video data packages from the transmission device via the transmission channels, wherein each of the transmission channels is independent; and
a frame arranging unit configured to generate a reception video data package by arrangement of the plurality of divisional video data packages in a frame order,
wherein the arrangement of the plurality of divisional video data packages in the frame order is based on the first information and the second information.

21. The transmission device according to claim 1, further comprising a demultiplier configured to:
demultiply a pixel clock that corresponds to the transmission video data package by ½ to obtain a transition-minimized differential signaling (TMDS) clock signal,
wherein the data transmitting unit is further configured to transmit, via the transmission channels, the TMDS clock signal to the external device in synchronization with the plurality of divisional video data packages.

* * * * *